United States Patent
Baalmann et al.

(10) Patent No.: US 6,619,844 B1
(45) Date of Patent: Sep. 16, 2003

(54) LINEAR ROLLING BEARING

(75) Inventors: Klaus Baalmann, Homburg (DE); Uwe Danneck, Ottweiler (DE); Kai Jelinek, Rosenkopf (DE); Udo Klein, Adenbach (DE); Frank Scheib, Neunkirchen (DE); Thomas Winkler, Sulzbach (DE)

(73) Assignee: INA-Schaeffler KG (DE)

( * ) Notice: Subject to any disclaimer, the term of this patent is extended or adjusted under 35 U.S.C. 154(b) by 15 days.

(21) Appl. No.: 10/049,076

(22) PCT Filed: Jul. 7, 2000

(86) PCT No.: PCT/EP00/06477
§ 371 (c)(1), (2), (4) Date: Mar. 8, 2002

(87) PCT Pub. No.: WO01/11251
PCT Pub. Date: Feb. 15, 2001

(30) Foreign Application Priority Data

Aug. 6, 1999 (DE) .......................... 199 37 278

(51) Int. Cl.$^7$ ................................. F16C 31/06
(52) U.S. Cl. ....................................... 384/43
(58) Field of Search ................. 384/43, 44, 45, 384/49, 51

(56) References Cited

U.S. PATENT DOCUMENTS

| | | | |
|---|---|---|---|
| 3,900,233 A | * 8/1975 | Thomson | 384/43 |
| 3,951,472 A | * 4/1976 | Schurger et al. | 384/43 |
| 3,951,473 A | * 4/1976 | Olschewski et al. | 384/43 |
| 3,967,865 A | * 7/1976 | Walter et al. | 384/43 |
| 4,456,312 A | 6/1984 | Rogers, III et al. | |
| 4,952,075 A | * 8/1990 | Rogers, III | 384/43 |
| 5,221,145 A | * 6/1993 | Borel | 384/43 |

FOREIGN PATENT DOCUMENTS

| | | |
|---|---|---|
| DE | 2402401 | 7/1974 |
| DE | 7338017 | 5/1975 |
| DE | 3507760 | 9/1985 |
| DE | 4210039 | 9/1993 |
| DE | 19741626 | 3/1999 |
| EP | 0323718 | 7/1989 |
| WO | 9701713 | 1/1997 |
| WO | 9821494 | 5/1998 |

* cited by examiner

*Primary Examiner*—Thomas R. Hannon
(74) *Attorney, Agent, or Firm*—Muserlian, Lucas and Mercanti

(57) ABSTRACT

In a linear rolling bearing, a plurality of ball circuits are arranged behind one another in peripheral direction around a guide rail. At least one ball circuit comprising a load-bearing section, a returning section and two deflecting sections which connect these load-bearing and returning sections to each other are retained in a segmental cage housing. This is formed by an inner cage part (11) and an outer cage part (12) and comprises a load-bearing raceway element (9) that is fitted into a through-aperture of the outer cage part (12). The balls (8) of the load-bearing section are supported on one side on a raceway of the load-bearing raceway element (9) and project through a slot (14) of the inner cage part (11) to be supported on another side on the guide rail for rolling in the longitudinal direction thereof. According to the invention, each segmental cage housing can be separately inserted and removed in radial direction from a recess of a cage bushing (1) surrounding the guide rail.

11 Claims, 3 Drawing Sheets

LINEAR ROLLING BEARING

FIELD OF THE INVENTION

The invention concerns a linear rolling bearing comprising a plurality of ball circuits that are arranged behind one another in peripheral direction around a guide rail, at least one ball circuit, comprising a load-bearing section, a returning section and two deflecting sections which connect these load-bearing and returning sections to each other, being retained in a segmental cage housing that is formed by an inner cage part and an outer cage part, a load-being raceway element being fitted into a through-aperture of the outer cage part, and balls of the load-bearing section being supported on one side on a raceway of the load-bearing raceway element, which balls project through a slot of the inner cage part and are supported on another side on the guide rail for rolling in a longitudinal direction of the guide rail.

The ball circuit of such a bearing possesses an optimum adaptability to changing conditions of operation, like flexions, and to locally differing conditions such as, for example, non-circularity of the guide rail. The balls, the load-bearing raceway elements and also the ball-returning raceways always align themselves to the guide rail so that the advantages of a low displacing force and a quiet, smooth-running and low-friction bearing that is practically maintenance-free are obtained.

BACKGROUND OF THE INVENTION

A linear rolling bearing of the pre-cited type for movement along a shaft is disclosed in the document WO 97101 713. In this bearing, three segmental cage housings are arranged directly next to one another in peripheral direction and require inter-engaging structures on their adjoining contact surfaces. If one of the segmental cage housings is removed, the other two housings lose their firm retention in peripheral direction.

Another linear rolling bearing is known from the document DE 42 10 039 A1 in which several segmental cage housings are arranged immediately adjacent to and behind one another in peripheral direction of a guide rail. To enable an adaptability of the load-bearing raceway elements to the guide rail, the peripherally successive segmental cage housings comprise elastic tongues that they are supported resiliently adjustable on one another. To obtain a coherence of all the segmental cage housings, two end, annular retaining elements are required. Therefore, in this case too, if the retaining elements are removed and one of the segmental cage housings is taken out, the rest of the housings lose their firm retention. The replacement of an individual housing is therefore rendered more difficult.

The document WO 98/21 494 shows a one-piece cage bushing with outwardly accessible spaces for lodging ball circuits and load-bearing raceway elements, so that the possibility of replacing individual ball circuits with their raceways in a simple manner does not exist.

SUMMARY OF THE INVENTION

The object of the invention is to provide a bearing which permits an insertion of individual segmental cage housings into the bearing and their replacement when, the bearing is in a mounted state on the guide rail without detriment to the optimal positioning of the segmental cage housings on the guide rail and to their mobility or retaining function during transportation.

This object is achieved according to the invention in that each segmental cage housing can be separately inserted and removed in radial direction from a recess of a circular cylindrical cage bushing surrounding the guide rail. The cage bushing comprises recesses that are accessible from its outer periphery and into each of which a segmental cage housing can be inserted in radial direction of the guide rail.

The inner cage part can comprise on each of its two ends pointing in longitudinal direction of the guide rail, a protruding knob which is snapped into a corresponding recess of the cage bushing. In this way, the individual segmental cage housings are suspended in the cage bushing so as to be freely movable independently of one another. The suspension of the housings in the cage bushing is effected by the knobs and cavities provided for this purpose.

The cage bushing can comprise spring lips each of which extends into one of the recesses and acts in radial direction of the bushing on the snapped-in knob. Each spring lip presses the segmental cage housing concerned even in the unloaded state against the guide rail so that the position of the housings is defined. When load alternation or a sudden application of operational load takes place, all the segmental cage housings are already in their correctly aligned positions. This contributes particularly to avoiding a rattling of the bearing components.

As can be seen in the drawings, each individual housing can possess full mobility (through 360°) about an imaginary axis A—A extending through the two associated recesses for the knobs. Their mobility about an imaginary axis B—B that extends radially from the guide rail through the center of the load-bearing raceway element (axial alignment) is restricted as is also their mobility about an imaginary axis C—C that extends tangentially of the guide rail in each case and centrally through the load-bearing raceway element concerned. The mobility in the radial direction of the guide rail is likewise restricted. This partial or restricted mobility results from the fact that the recesses have a larger diameter than the inserted knobs. Due to the force action chain "loaded balls—load-bearing raceway element—segmental cage housing—unloaded balls" each housing adjusts itself to the guide rail fully independently of the other segmental housings. Since the individual segmental housings can move so as to adapt themselves to the shape of the guide rail, a simultaneous motion of the segmental cage housings is produced relative to a machine housing in which the cage bushing is received. This is made possible by the fact that the load-bearing raceway element has a back that is rounded in two directions and can therefore roll on the inner bore surface of the machine housing in which they are situated.

The load-bearing raceway element does not have to have only one groove but a plurality of parallel raceways for balls of the load-bearing sections can be configured thereon. The manufacture and mounting of the segmental cage housings are simplified if the outer cage part of each segmental cage housing is configured as a plastic part injected onto the load-bearing raceway element. The exactly defined seating of the load-bearing raceway element in the segmental housing results in an improved ball circulation (less noise generation), a precise jerk-free guidance of the balls when entering the loaded region and a reduction of the displacing force pulsation. It is therefore no longer necessary to configure special lead-in geometrical shapes (lead-in phases) on the ends of the load-bearing raceway elements. It is also possible to inject the segmental cage housing comprising an outer cage part and an inner cage part onto the load-bearing raceway element to form a one-piece plastic component. Injection or integral shaping reduces the number of parts to be mounted.

Due to the one-piece structure of the load-bearing raceway element and the segmental cage housing, a force-locked connection is obtained that makes it possible to incorporate parts of the ball deflecting sections that are configured in the injected plastic component into the load-bearing region. Thus, the transition "ball deflection—load-bearing raceway" can be configured in radial direction of the guide rail so that a step or a ramp higher than the load-bearing raceway element is formed in the unloaded state in the plastic component. The step or ramp must be dimensioned so that, taking into account the different depths of penetration of the balls into steel and plastic, the step or ramp disappears under load.

The cage bushing can have two end rings extending in planes vertical to the longitudinal direction of the guide rail, pairs of substantially parallel slots forming resilient regions being arranged on each end ring. Each segmental cage housing is then retained on its two end surfaces oriented in longitudinal direction of the guide rail by two corresponding resilient regions of the two end rings. The segmental cage housings can be retained in the cage bushing, for example, by end knobs that are inserted into apertures of the resilient regions. However, it is also possible to fix the segmental cage housings on the resilient regions of the cage bushing by glued or welded end surfaces. In this way, a system of inserting the segmental cage housings into the cage bushing is obtained which assures the mobility of the individual housings and offers protection against rotation, so that the housings are always in a defined position before the filled cage bushing is pushed onto the guide rail. Besides this, the system operates lash-free and permits a defined biasing of the segmental cage housings. The housings are biased either in a direction toward the guide rail or away from the guide rail toward the machine housing in which the cage bushing is lodged.

To obtain a linear rolling bearing requiring no or only very little maintenance, the segmental cage housings can comprise in the region of the load-bearing section for the balls and/or in the returning section for the balls, hollow spaces forming grease reservoirs.

A permanent, firm coherence of the segmental cage housings can also be obtained in that the inner cage part comprises side recesses into which side knobs of the outer cage part that is inserted into the inner cage part snap.

BRIEF DESCRIPTION OF THE DRAWINGS

Examples of embodiment of the invention are represented in the drawing and will be described more closely below. The drawing shows in.

DETAILED DESCRIPTION OF THE DRAWING

Figure 1:
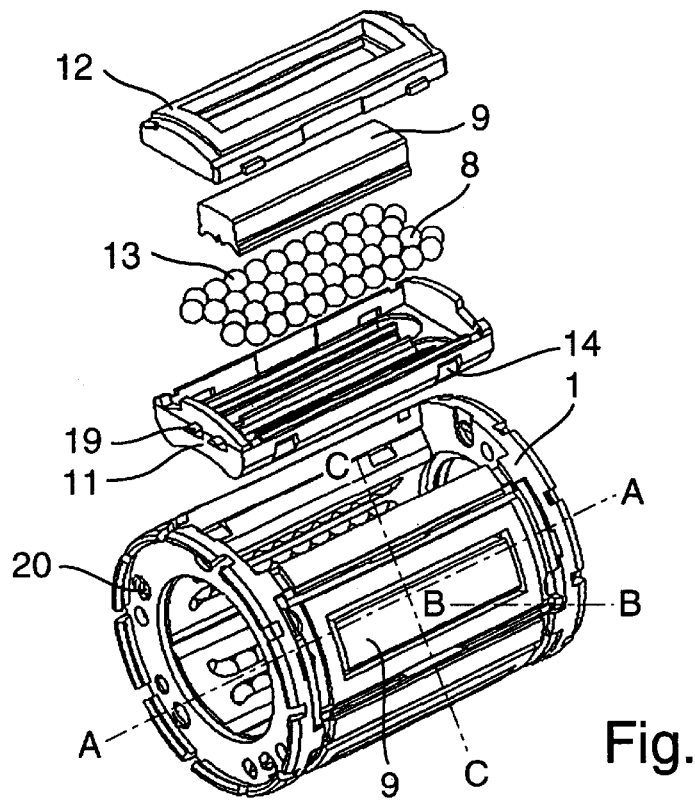
FIG. 1, a linear rolling bearing according to the invention in an exploded perspective representation.
Figure 2:
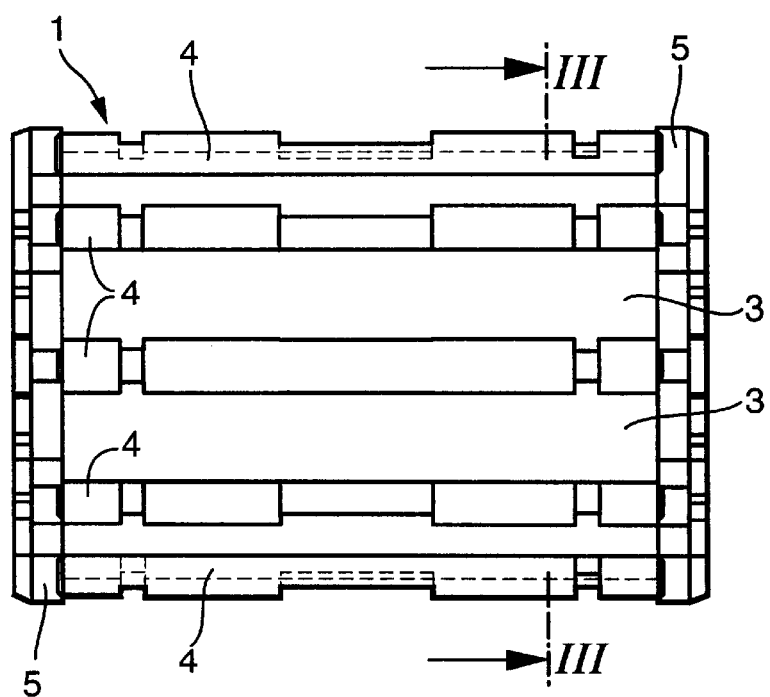
FIG. 2, a cage bushing of the bearing in a side view.
Figure 3:
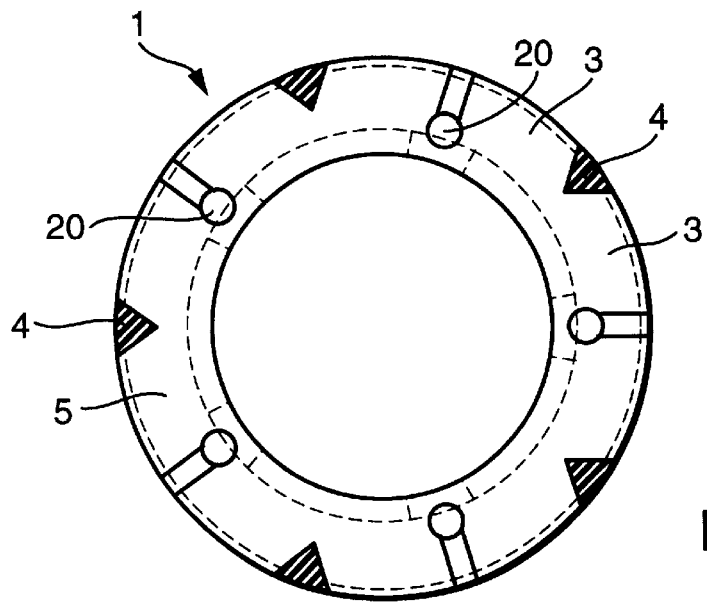
FIG. 3, a cross-section through the cage bushing along line III—III of FIG. 2.

A linear rolling bearing according to the invention comprises a cage bushing 1 that surrounds a guide rail 2. The guide rail 2 has a circular configuration in cross-section and the cage bushing 1 is a cylindrical body that comprises, on its periphery, five spaced identical recesses 3 arranged behind one another in peripheral, direction. These recesses 3 are made as through-openings in radial direction so that parallel cage bars 4 are formed that connect two end rings 5 of the cage bushing 1 to each other.

Figure 5:
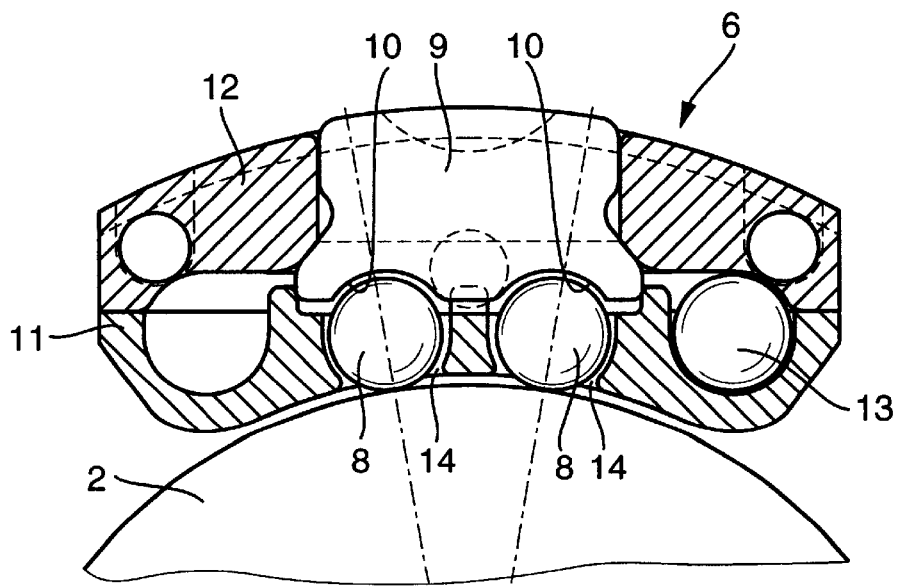
FIG. 5, a segmental cage housing supported on a guide rail, in cross-section.
Figure 6:
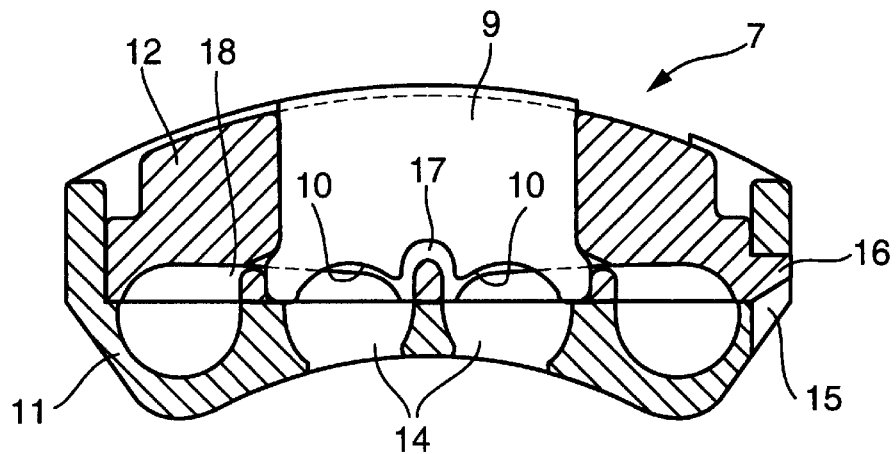
FIG. 6, a segmental cage housing modified relative to FIG. 5, in cross-section.

In each recess 3 of the cage bushing 1 is inserted a segmental cage housing 6 as represented in FIG. 5, or a segmental cage housing 7 as represented in FIG. 6. Each segmental cage housing comprises two endless ball circuits. FIG. 1 shows the parts making up the segmental cage housing 7. In both the segmental cage housings 6 and 7, balls 8 of the load-bearing section of a circuit are supported both on the guide rail 2 and on a load-bearing raceway element 9 that is inserted into the segmental cage housing. These balls 8 can roll in the longitudinal direction of the guide rail 2 and of the load-bearing raceway element 9. As can be seen in FIGS. 5 and 6, raceways 10 are provided for this purpose in the load-bearing raceway element 9.

Figure 4:
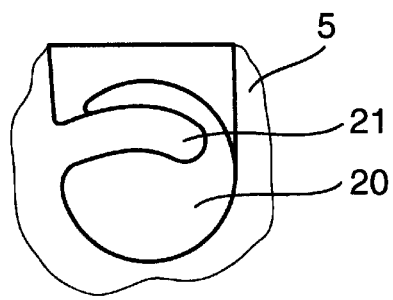
FIG. 4, an enlarged representation of the region of a recess of the cage bushing comprising a spring lip.

Both segmental cage housings, 6 and 7, comprise an inner cage part 11 and an outer cage 12 part inserted therein. Similar to the cage bushing 1, these parts are also plastic parts and comprise channels for receiving two ball circuits i.e., for receiving balls 8 of the load-bearing, sections, balls 13 of the returning sections and balls of the deflecting sections. Each inner cage part 11 comprises two slots 14 extending in longitudinal direction of the guide rail 2, through which slots the balls 8 of the load-bearing sections extend so as to make contact with the surface of the guide rail 2. The load-bearing raceway element 9 that likewise extends in longitudinal direction of the guide rail 2 is arranged and retained in a through-aperture of the outer cage part 12. As can be seen in FIG. 6, the inner cage part 11 and the outer cage part 12 are held together by the fact that the inner cage part 11 comprises, on its side walls, side recesses 15 into which side knobs 16 of the outer cage part 12 are snapped. This embodiment further comprises a longitudinally extending hollow space 17 in the region of the load-bearing sections, and hollow spaces 18 in the region of the returning sections of the ball circuits. These hollow spaces serve to receive lubricant for the balls 8 and 13 in circulation. Each segmental cage housing, 6 and 7, is suspended in its recess 3 in the cage bushing 1 for slight pivoting so that the balls 8 of the load-bearing sections and the load-bearing raceway elements 9 can adapt themselves to the surface and the shape of the guide rail 2 during the rolling motion. For this purpose, the inner cage part 11 comprises on each of its end faces a protruding knob 19, and the two knobs 19 of an inner cage part 11 are aligned to each other. For receiving these knobs 19, the end rings 5 of the cage bushing 1 comprise aligned recesses 20 which have a larger diameter than the knobs 19. This results in an additional adjusting capability of the entire segmental cage housing 6, 7 within the cage bushing 1. As shown in FIG. 4, a spring lip 21 can extend into each recess 20. This spring lip acts on the segmental cage housing 6, 7 through the knob 19 in radial direction toward the guide rail 2, or it can apply a force to the segmental cage housing in the opposite direction. The axes A—A, B—B, C—C shown in FIG. 1 represent the possibilities of movement of the segmental cage housings.

Figure 7:
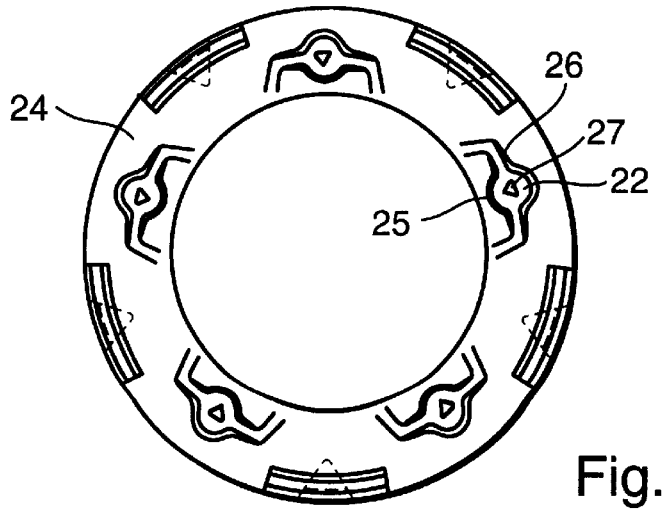
FIG. 7, an end view of a cage bushing modified relative to FIG. 3.
Figure 8:
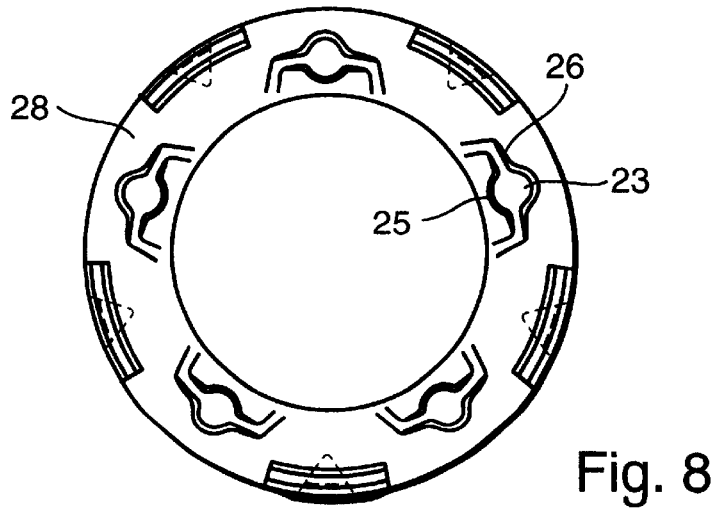
FIG. 8, an end view of a further cage bushing modified relative to FIG. 3.

According to FIGS. 7 and 8, the slightly mobile suspension of the segmental cage housing 6, 7 in the cage bushing 1 can also be obtained by making slots in the end rings of the cage bushing 1 so that resilient regions 22, 23 are formed. FIG. 7 shows an end ring 24 of a cage bushing in which each resilient region 22 is formed by an inner slot 25 and a substantially parallel slot 26. Each resilient region 22 comprises a central aperture 27 into which a knob 19 of the adjoining segmental cage housing 6, 7 is inserted. According to FIG. 8, the end rings 28 of a cage bushing have a substantially similar configuration to those of FIG. 7 because the resilient regions 23 are likewise defined by inner slots 25 and outer slots 26. The connection between the segmental cage housing 6, 7 and the end rings 28 is made in this case by gluing or welding the segmental cage housing to the resilient regions 23.

LIST OF REFERENCE NUMERALS

| | |
|---|---|
| 1 | Cage bushing |
| 2 | Guide rail |
| 3 | Recess |
| 4 | Cage bar |
| 5 | End ring |
| 6 | Segmental cage housing |
| 7 | Segmental cage housing |
| 8 | Ball of load-bearing section |
| 9 | Load-bearing raceway element |
| 10 | Raceway |
| 11 | Inner cage part |
| 12 | Outer cage part |
| 13 | Ball of returning section |
| 14 | Slot |
| 15 | Side recess |
| 16 | Side knob |
| 17 | Hollow space |
| 18 | Hollow space |
| 19 | Knob |
| 20 | Recess |
| 21 | Spring lip |
| 22 | Resilient region |
| 23 | Resilient region |
| 24 | End ring |
| 25 | Inner slot |
| 26 | Outer slot |
| 27 | Aperture |
| 28 | End ring |
| A—A | Axis |
| B—B | Axis |
| C—C | Axis |

What is claimed is:

1. Linear rolling bearing comprising a plurality of ball circuits that are arranged behind one another in peripheral direction around a guide rail (2), at least one ball circuit, comprising a load-bearing section, a returning section and two deflecting sections which connect these load-bearing and returning sections to each other, being retained in a segmental cage housing (6, 7) that is formed by an inner cage part (11) and an outer cage part (12), a load-bearing raceway element (9) being fitted into a through-aperture of the outer cage part (12), and balls (8) of the load-bearing section being supported on one side on a raceway (10) of the load-bearing raceway element (9), which balls project through a slot (14) of the inner cage part (11) and are supported on another side on the guide rail (2), characterized in that each segmental cage housing (6, 7) can be separately inserted and removed in radial direction from a recess (3) of a circular cylindrical cage bushing (1) surrounding the guide rail (2).

2. Rolling bearing according to claim 1, characterized in that the inner cage part (11) comprises on each of its ends pointing in longitudinal direction of the guide rail (2), a protruding knob (19) which is snapped into a corresponding recess (20) of the cage bushing (1).

3. Rolling bearing according to claim 2, characterized in that the cage bushing (1) comprises spring lips (21) each of which extends into one of the recesses (3) and acts in radial direction of the bushing on the snapped-in knob (19).

4. Rolling bearing according to claim 2, characterized in that the cage bushing comprises two end rings (24, 28) extending in planes vertical to the longitudinal direction of the guide rail (2), pairs of substantially parallel slots (25, 26) forming resilient regions (22, 23) being arranged on each end ring, (24, 28) and each segmental cage housing (6, 7) being retained on its two end surfaces oriented in longitudinal direction of the guide rail (2) by two corresponding resilient regions (22, 23) of the two end rings (24, 28).

5. Rolling bearing according to claim 4, characterized in that the segmental cage housings (6, 7) are retained in the cage bushing by end knobs (19) that are inserted into apertures (27) of the resilient regions (22).

6. Rolling bearing according to claim 4, characterized in that the load-bearing raceway elements are fixed on the resilient regions (23) of the cage bushing by glued or welded end surfaces.

7. Rolling bearing according to claim 1, characterized in that a plurality of parallel raceways (10) for balls (8) of the load-bearing sections are configured on the load-bearing raceway element (9).

8. Rolling bearing according to claim 1, characterized in that the outer cage part (12) of each segmental cage housing (6, 7) is configured as a plastic part injected onto the load-bearing raceway element (9).

9. Rolling bearing according to claim 1, characterized in that the segmental cage housing comprising an outer cage part and an inner cage part is injected onto the load-bearing raceway element to form a one-piece plastic component.

10. Rolling bearing according to claim 1, characterized in that the segmental cage housing (7) comprises in the region of the load-bearing section for the balls (8) and/or in the region of the returning section for the balls (13), hollow spaces (17, 18) serving as grease reservoirs.

11. Rolling bearing according to claim 1, characterized in that the inner cage part (11) comprises side recesses (15) into which side knobs (16) of the outer cage part (12) that is inserted into the inner cage part (11) are snapped.

\* \* \* \* \*